(12) United States Patent
Binker et al.

(10) Patent No.: US 6,279,261 B1
(45) Date of Patent: Aug. 28, 2001

(54) THERMAL PEST CONTROL

(75) Inventors: Gerhard Binker, Rückersdorf; Joachim Binker, Rasch, both of (DE)

(73) Assignee: Binker Materialschutz GmbH (DE)

(*) Notice: Subject to any disclaimer, the term of this patent is extended or adjusted under 35 U.S.C. 154(b) by 0 days.

(21) Appl. No.: 09/318,168

(22) Filed: May 25, 1999

(30) Foreign Application Priority Data

Jun. 10, 1998 (DE) ............................................. 198 25 880

(51) Int. Cl.$^7$ ................................................. A01M 13/00
(52) U.S. Cl. .................................. 43/125; 422/32; 422/37
(58) Field of Search ........................... 43/124, 125, 129, 43/130; 422/32, 37

(56) References Cited

U.S. PATENT DOCUMENTS

| | | | |
|---|---|---|---|
| 1,775,703 | * 9/1930 | Stokes | 43/129 |
| 1,861,736 | * 6/1932 | Bersie | 43/125 |
| 2,083,950 | * 6/1937 | Guba | 43/129 |
| 2,123,767 | * 7/1938 | Clayton et al. | 43/125 |
| 2,473,684 | * 6/1949 | Howard | 43/129 |
| 2,784,466 | * 3/1957 | Burns, III | 43/125 |
| 3,382,603 | * 5/1968 | Oberto | 43/129 |
| 4,620,388 | * 11/1986 | Imagawa | 43/130 |
| 4,651,463 | * 3/1987 | Friemel | 43/125 |
| 4,676,152 | 6/1987 | Tsuji et al. | 99/468 |
| 4,817,329 | 4/1989 | Forbes | 43/124 |
| 5,203,108 | 4/1993 | Washburn, Jr. | 43/130 |
| 5,326,543 | * 7/1994 | Fiorenzano, Jr. | 422/32 |
| 5,403,597 | 4/1995 | Mueller | 43/125 |
| 5,678,352 | * 10/1997 | Leitner et al. | 43/125 |
| 5,753,183 | * 5/1998 | Ohr et al. | 422/37 |
| 5,932,172 | * 8/1999 | Winks | 422/32 |

FOREIGN PATENT DOCUMENTS

| | | |
|---|---|---|
| 0 416 225 A1 | 3/1991 | (DE) . |
| 40 25 828 A1 | 2/1992 | (DE) . |
| 4308585 | * 9/1994 | (DE) . |
| 43 08 585 A1 | 9/1994 | (DE) . |
| 19506631 | * 8/1996 | (DE) . |
| 296 18 646 U1 | 2/1997 | (DE) . |
| 195 45 926 A1 | 6/1997 | (DE) . |
| 196 20 050 A1 | 11/1997 | (DE) . |
| 196 21 516 | 12/1997 | (DE) . |
| 19621516 | * 12/1997 | (DE) . |
| 197 30 254 A1 | 1/1998 | (DE) . |
| 29803452 | * 8/1998 | (DE) . |
| 0 113 321 A3 | 7/1984 | (EP) . |
| WO 92/00173 | 1/1992 | (EP) . |
| 0 676 138 | 10/1995 | (EP) . |
| 676138 | * 10/1995 | (EP) . |
| 438 222 | 5/1912 | (FR) . |
| 438222 | * 5/1912 | (FR) . |

OTHER PUBLICATIONS

"Pest Control with Heat in Mills, Bakeries and Restaurants", H. Hofmeier, Die Muhle + Mischfuttertechnik, vol. 133, Nos. 51/52, Dec. 19, 1996, pp. 842 ff.*

"Thermal Pest Control in Mills", J.A. Teich, Die Muhle+ Mischfuttertechnik, vol. 133, No. 11, Mar. 14, 1996, pp. 172 ff.*

* cited by examiner

*Primary Examiner*—Darren W. Ark
(74) *Attorney, Agent, or Firm*—McGlew & Tutle, P.C.

(57) ABSTRACT

In a process for thermal pest control, a fuel-operated heater with separate flue gas routing is used to heat up a space to be treated. Fumigants may be additionally introduced into the air of the space to be treated, especially if the combustion chamber 13 of the heater is separated from the heat exchanger chamber 8 of the heater in a gas-tight manner. The process is particularly suitable for disinfecting mills and food-processing plants.

12 Claims, 1 Drawing Sheet

THERMAL PEST CONTROL

FIELD OF THE INVENTION

The present invention pertains to the control of pests mainly in the protection of stored products or in food-processing plants by means of heat.

BACKGROUND OF THE INVENTION

Oil- or gas-heated burners have been used in Denmark for a rather long time for controlling *Hylotrupes bajulus* in roofs. Oil or gas is burned and the heat released in the process heats air, which is introduced with the combustion gases into the infested roof truss. After a correspondingly long exposure time, the pests in the rafters are dead. Similar processes are also used to control termites and cockroaches in the U.S.A. The buildings are wrapped in foils or tarpaulins at the same time in this process in order to keep the heat loss as low as possible. The wrapping of the buildings in tent foils is not possible or too expensive in the case of large objects, such as mills or large food-processing plants.

WO 92/00173 describes a process from the Netherlands, in which the heated air in the room being treated is additionally maintained at a minimum humidity level. The combustion gases are disadvantageously introduced into the room being treated; this process cannot be used in food-processing plants.

EP 0 416 255 A1 describes a process in which a mill, which is infested with pests, is freed from pests such that the inner walls are heated to a minimum temperature of about 27° C. before carbon dioxide is admitted. For heating, heating devices are set up in the room to be treated itself, and the carbon dioxide is heated as well.

A thermal disinfestation process, in which explosion-proof electric heaters set up in the room to be treated are used, is described in the article by H. Hofmeier, Pest Control with Heat in Mills, Bakeries and Restaurants, *Die Mühle+ Mischfuttertechnik,* Vol. 133, Nos. 51/52, Dec. 19, 1996, pp. 842 ff. The energy consumption is very high due to the relatively low efficiency of the electric heater, and mills with large room space can be heated up for pest control only if a block-type thermal power station is additionally available.

Electric heaters for pest control in mills, etc., are also described in the utility model DE 29618646 U1.

The article by J. A. Teich, Thermal Pest Control in Mills, *Die Mühle+ Mischfuttertechnik,* Vol. 133, No. 11, Mar. 14, 1996, pp. 172 ff., describes a process in which hot steam is used for disinfection in mills. However, the hot steam may precipitate on cooler parts and damage due to moisture may thus occur in the mill. In addition, molds will increasingly grow after the heat treatment because of the increased moisture content present in the mill after the treatment.

Combinations of heat with carbon dioxide, phosphine and dichlorvos have become known from the U.S.A. U.S. Pat. No. 5,403,597 describes a combined process comprising heat from steam, natural gas and electricity, carbon dioxide and phosphine. Electric heaters are used predominantly. The electric heaters consume a very large amount of energy, and they are therefore sometimes replaced with gas-heated furnaces. These are operated until shortly before the admission of carbon dioxide and phosphine and are then switched off, because phosphine would decompose in the gas-heated burner. The consequence would be even more intense corrosion phenomena than those induced by phosphine itself. In addition, this process has the drawback that the room to be treated cools more or less rapidly during the gas exposure time after the gas-heated burners have been switched off (Fumigation and Pheromones Workshop, West Lafayette, Ind., U.S.A., 1996, with practical demonstration of the process by D. and J. Mueller). This leads to a loss of effectiveness during the process, because the pests breath in the phosphine substantially more rapidly at higher temperatures.

Problems also occur in the case of the use of carbon dioxide as a fumigant with the simultaneous heating of the atmosphere in the room being treated by means of oil- or gas-heated burners. Flue gases, which may contaminate the food remnants or foods proper in the room being treated, are generated by the combustion process. In particular, fuel oil contains sulfur compounds, which can be found in the form of sulfate or sulfite in food remnants in the mill. An overpressure is also generated in the room being treated due to the combustion process, because additional gases are introduced into the room being treated, so that the sealing needed for the fumigation may be damaged and greater losses of gas or heat may occur.

SUMMARY AND OBJECTS OF THE INVENTION

The primary object of the present invention is to provide a process in which thermal pest control can be carried out in mills or other food-processing plants or food warehouses economically and effectively, and these processes may optionally also be employed combined with fumigation processes without, e.g., increased losses of gas or temperature drops occurring during the treatment.

According to the invention, a process is provided for the disinfestation of mills, food-processing plants or other pest-infested rooms with hot air by introducing hot air into the room to be treated by means of a fuel-heated heater. The heater has a separate flue gas routing, as a result of which no flue gases will enter the room being treated. The heater has a combustion chamber, which is separated by a heat exchanger from a heat exchanger chamber. The air to be heated is removed from the room being treated through the heat exchanger chamber continuously or intermittently, heated and returned into the room being treated. The combustion chamber is separated from the heat exchanger chamber in a gas-tight manner. Sulfuryl fluoride is introduced as a fumigant into the room being treated before, during or after the heating of the air of the room being treated.

As in the state of the art, e.g., oil- or gas-heated burners or combustion chambers heated with other fuels are used in the process according to the present invention. The air in the room to be treated is heated via heat exchanger surfaces. The atmosphere of the room being treated is separated from the burner space of the heater in a gas-tight manner in the process according to the present invention, and the heater is preferably located outside the room to be treated. This offers the advantage that the air of the room to be treated is not contaminated with flue gases, because these are removed from the combustion chamber, e.g., into the environment.

Since the air of the room to be treated, which air is to be heated, does not come into contact with open flames or red hot parts or particles, the process is also suitable for heating mills without flour dust explosions occurring.

In the preferred embodiment of the present invention, part of the atmosphere of the treated room, which atmosphere is to be heated, is passed continuously or intermittently or in a controllable manner through the heat exchanger chamber of the heater, heated in the process, and returned into the room to be treated. A circulation is generated as a result, and the heat is thus distributed uniformly in the room being treated. The distribution of the heat in the room being treated may be brought about additionally by means of pipe distributions in the room being treated, so that high temperatures desirable for killing the insects can be reached even in areas in which the temperatures are sometimes low. Due to the gas-tight separation of the heat exchanger chamber from the combustion chamber and the gas-tight routing of the pipes, gases can be additionally introduced into the heat circulation. The fumigants additionally introduced into the room to be treated, which are then distributed uniformly in the room being treated due to the circulation by means of the heater or heaters, ensure an even more rapid killing of the insects. The fumigants are particularly effective due to the increase in temperature, because the insects breath more or less rapidly depending on the ambient temperature and thus they rapidly incorporate the fumigants and are killed more rapidly. The fumigants are preferably introduced into the room to be treated after this room has been heated or they are introduced into the room to be treated after adding carbon dioxide, because constant pressure conditions will then usually occur in the room being treated.

The oil or gas consumption is still relatively low in the process according to the present invention even in the case of large room spaces to be heated, even if the temperature of the room is increased to 60° C. or higher. The efficiencies are substantially higher in the case of the heating according to the present invention with separate flue gas routing than in the case of heating with electric heaters. In addition, the heating with separate flue gas routing offers the advantage that if a fumigant is additionally admitted into the room to be heated during the heating process or the temperature holding process in the room being treated, no appreciable additional overpressure occurs, because only the atmosphere in the room being treated is circulated, and the relatively small amounts of the fumigant to be introduced do not practically generate any overpressure in the room being treated. However, an increase in pressure can be noted due to the heating or the increase in the volume flow due to the heating, because warm air expands. Due to the fact that no additional overpressure occurs in the room being treated (i.e., the room to be heated), less heat and fumigant will escape from the room being treated. An air-filled hollow body, which was introduced beforehand, can be emptied into the environment in the room being treated during the phase of heating, as a result of which the overpressure generated by thermal expansion in the room being treated is eliminated. This consequently means a reduced loss of fumigant and heat into the environment and no damage to the sealing. In the preferred embodiment of the present invention, the air of the room to be treated is drawn in, in the cooler areas of the room to be treated, e.g., a mill, i.e., especially in the basement or the area of the first floor, and the heated air is introduced preferably into cooler areas or into colder areas or colder floors of the room or building to be treated, e.g., a mill. A substantially more effective and rapid heating and also a more uniform heating are achieved as a result.

By arranging at least one temperature sensor in the room to be treated, it is also possible to set a desired temperature in the room being treated in a controlled manner and to maintain the temperature, e.g., at a constant value or to regulate it in another way. It is also possible to humidify the room to be treated or its atmosphere in a controlled manner. In the preferred embodiment of the present invention, water is sprayed into the return line for the heated air from the heater to the room being treated via an atomizer or a nozzle. Using at least one humidity sensor, which is introduced into the room to be treated, the relative humidity of the air can be determined and controlled in the room being treated by means of a control unit according to a set point or characteristics or a humidity profile, as, e.g., according to Keylwerth's diagram in the presence of wood, e.g., for disinfection in churches and museums, by means of a control unit.

All parts of the heater, especially the heat exchanger part of the heater, may have an explosion-proof design for areas in which there is a risk of explosion, such as flour mills. Using the process according to the present invention, even large mill rooms can be heated relatively rapidly to lethal temperatures for insects, namely, at least 42° C., especially if a plurality of heating units are used. Room or material temperatures of about 50° C. to 65° C. are desirable in the room being treated.

Temperatures of only about 22° C. to about 40° C. are desirable in the room being treated if fumigant is added. The suitable fumigants include halogenated hydrocarbons, organic esters, organic nitro compounds, organic acetates, organic carbinols, carbonyl sulfide, dicyanogen, hydrogen cyanide, phosphine, organophosphines, sulfuryl fluoride, sulfonyl fluoride, carbon dioxide, nitrogen, noble gases, sulfur hexafluoride, and mixtures thereof.

The gas concentration of the fumigant added is preferably between 10 ppm and about 150 g/m$^3$ and about 30 vol. % to about 99.99 vol. %, the higher concentrations being preferred in the case of inert gases and the lower concentrations being preferred in the case of the toxic gases.

A fan unit, which preferably has a high compression, is preferably installed in the heater. Flow resistances, caused especially by bends, elbows, etc., in the flexible tubes, tubes or lines for carrying air or warm gas (circulation from the room being treated via the heater and back into the room being treated), can thus be avoided. Long feed lines and flexible distributor tubes may also be used in this case. The flexible distributor tubes are now located in the building/room to be treated if needed.

The room spaces to be treated are, on the average, between 1,000 cbm and 100,000 cbm. The heat-up times range, on the average, from a few hours to preferably about 12 to 18 hours. The exposure times to heat in the room being treated range, on the average, from at least 1 hour to about 3 to 10 hours and, depending on, e.g., the pest infestation, also up to about 40 hours.

If fumigants are added, the exposure times are between about 6 and 48 hours in the case of the "fumigant/heat" combination in the case of toxic gases and between about 6 to 136 hours in the case of the addition of inert gases. If inert gases mixed with toxic gases are added, the exposure time can be reduced to about 3 hours to about 24 hours. The heat exchanger temperature, especially the heat exchanger surface temperature, must not be equal to or higher than the decomposition temperature of the fumigant added, because the fumigant would otherwise undergo thermal decomposition on the surface of the heat exchanger. In the case of, e.g., sulfuryl fluoride as an added fumigant, the heat exchanger surface temperature should not be higher than 400° C. to 450° C. The heat exchanger surface temperature can be influenced, e.g., by selecting the size of the combustion chamber of the heater, by using a gas-heated heater (heating oil-heated heaters generate higher combustion temperatures) or by the output steps of the heater. Recirculated air heaters and fresh air heaters are preferably used. The pest control process also becomes more economical if the flue gas of the heater is freed from unburned organic gases and is additionally introduced into the room (1) being treated. The flue gas freed from unburned organic gases and introduced into the room (1) being treated has a low oxygen content and a high carbon dioxide content and the pests will be killed more rapidly as a result. Furthermore, it contains water vapor, which increases the humidity of the air in the room (1) being treated more advantageously. The removal of unburned organic gases may be performed especially by thermal after burning, catalysis or filtration. Additional advantages and details of the present invention appear from the following examples, and FIG. 1.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
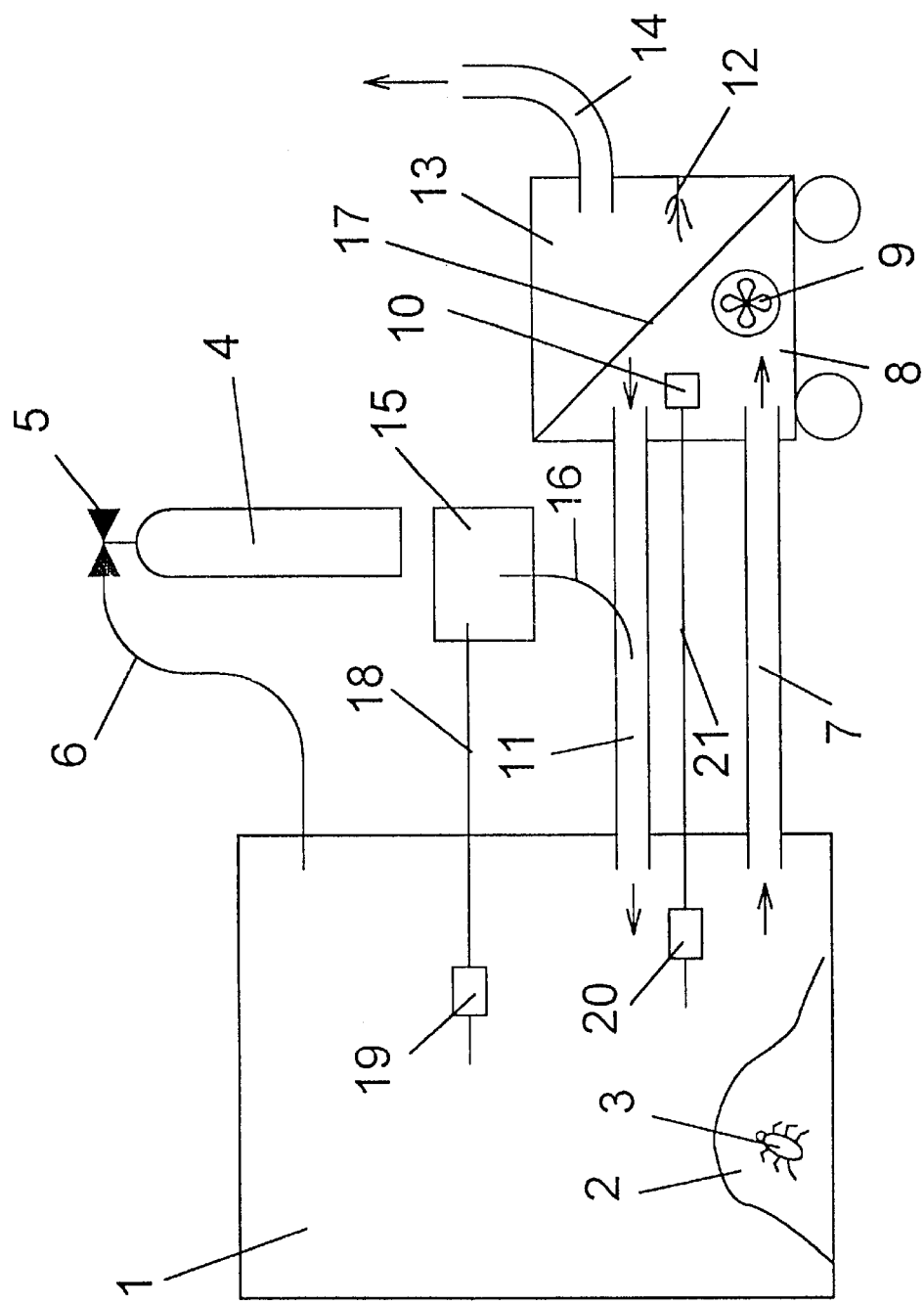
FIG. 1 is a schematic diagram of an example of the invention.

Referring to the drawings in particular, FIG. 1 shows an exemplary embodiment with gaps and cracks and other hiding places for insects as well as food remnants 2. The harmful insects are located in a mill 1. The building 1 is sealed against heat and gas loss in a sufficiently gas-tight manner. The building is then heated by means of an oil-heated heater with the heat exchanger chamber 8 and the combustion chamber 13. The air of the room to be treated is drawn in via the exhaust pipe 7, which leads from the room 1 to be treated to the heat exchanger chamber 8 and is returned into the room 1 to be treated via the return line 11 by means of the fan 9. The air contained in the room 1 is heated as a result. The fuel, e.g., heating oil, is burned in the combustion chamber 13 by means of the burner 12, and the resulting flue gases are discharged into the atmosphere as an outgoing air flow via the outgoing air pipe 14. The separation 17 between the combustion chamber 13 and the heat exchanger chamber 8 preferably has a gas-tight design (shown schematically in FIG. 1). As a result, combustion gases are prevented from entering the heat exchanger chamber 8 and the circulating flow in the pipes 7 and 11 and the room 1 being treated, on the one hand, and, on the other hand, recirculated atmosphere does not enter the combustion chamber 13.

The actual temperature is measured by means of the temperature sensor 20 arranged in the room 1 being treated and is sent via the measuring line 21 to the control unit 10, which will then set the desired circulation temperature.

The relative humidity of the air in the room 1 being treated is measured by means of the humidity sensor 19 and is sent via the measuring line 18 to the humidifying device 15, which will then inject or atomize water into the return line 11 via the metering line 16. As soon as the temperature set point or the set point of the relative humidity of the air in the room 1 being treated has been reached, the metered feeding in of water or the heating is terminated or adjusted such that a constant value will be set in the room 1 being treated. To expedite the action, a fumigant may be additionally introduced into the room 1 being treated from the storage cylinder 4 via the feed line 6 after opening the valve 5. The introduction of the fumigant or the resupply may also be carried out via a control circuit.

Due to the gas-tight design of the separation 17 between the combustion chamber 13 and the heat exchanger chamber 8, no toxic fumigant, which was fed from the storage cylinder 4 into the room 1 being treated, will enter the combustion chamber 13. Due to the separation 17, no fumigant will be lost to the environment via the heater, either. In addition, thanks to the separation 17, the fumigant does not enter the burner 12 or the combustion chamber 13. Thermal decomposition of the fumigant is ruled out as a result. Corrosion due to predominantly acid combustion gases or decomposition products formed due to thermal decomposition is also avoided. After the end of a sufficient exposure time, the heater is switched off, and the room 1 being treated can be ventilated. The production process can be continued and the treated room 1 can be used again for its intended purpose.

APPLICATION EXAMPLE 1

A flour mill is infested with moths, which are harmful for the stored products, and rice weevils. The doors and windows as well as the other openings of the mill are sealed against heat loss in a sufficiently gas-tight manner. The room air in the mill is then heated by means of a heater, as shown in FIG. 1, from an initial value of about 17° C. to about 56° C. within 6 hours. As soon as the temperature has reached about 56° C. in representative areas of the room, this temperature is maintained at a constant value by means of the heater over about 30 hours. Since the relative humidity of the room air was initially 56%, the relative humidity of the air was also slowly increased during the heating process, so that when the (final) temperature of about 56° C. was reached in the room air at the end of the heating process, an increased relative humidity is also present in the air to avoid damage to furnishings of the mill. The final humidity (relative humidity of the air) now equals 72%. The humidification of the atmosphere during the heat-up and the holding of the temperature also offers the advantage that the air is heated up more rapidly.

After a corresponding exposure time to the hot air (about 28 hours), the air heater is switched off and the mill slowly cools down due to the natural exchange of air, which is still present despite the sealing. The humidification is also switched off now to prevent condensation phenomena from occurring in the mill. Test insects, consisting of all stages of the moths and of the rice weevil, which were introduced to temperature-critical areas before heating, show after evaluation that these test insects have been killed by the treatment.

EXAMPLE 2

A hulling mill is infested with flat grain beetle as well as *Plodia interpunctella* and *Ephestia kuehniella*. All openings, doors and large cracks in the wall of the mill are sealed in a gas-tight manner. Processing machines containing milling residues, which are likewise infested with, e.g., moth eggs, are accommodated in the attic of the mill. These machines also must be subjected to the pest control.

The attic of the mill already has a temperature of about 32° C. due to exposure to sunlight, but only a temperature of 16° C. can be measured on the first floor.

Test insects in cages are introduced in various areas of the mill. The cages also contain insect brood. Hot air is introduced into the hulling mill by means of a heater according to FIG. 1 via the heat exchanger with separate flue gas routing. A target temperature of about 25° C. is sought to be reached in the mill. This temperature is reached in as little as 4 hours. All wall surfaces, objects, machines, woodwork, etc., in the mill now have a temperature of 25° C. The blow-off pipe, arriving from the heat exchanger chamber of the heater, opens into the first floor of the mill, while the intake pipe is led from the attic to the heat exchanger chamber of the heater. After the temperature set point of 25° C. has been reached in the mill, sulfuryl fluoride is introduced into the mill from a storage cylinder. The introduction is terminated when the sulfuryl fluoride concentration in the air of the room equals 50 g/cbm. The air contained in the hulling mill, which now also contains sulfuryl fluoride, is led through the heat exchanger chamber of the heater and is maintained continuously at 25° C. as constantly as possible. The sulfuryl fluoride concentration is also maintained at a constant value of about 50 g/cbm by the resupply, which is necessary because of the inevitable losses of gas. After an exposure time of about 36 hours to sulfuryl fluoride and heat, the heater is switched off and the mill is ventilated. An evaluation of the test insects shows that all pests in the cages have died.

EXAMPLE 3

A flour mill is infested by flour beetle and *Ephestia elutella* (a moth species). The mill is sealed in a sufficiently gas-tight manner and hot air is then introduced into the mill by means of a heater according to FIG. 1 at a starting temperature of 18° C. The temperature in the mill is increased to 30° C., doing so at a heat-up rate of 4° C. per hour. Stresses on the furnishings and machines of the mill are avoided as a result. When a temperature of 30° C. has been reached, this temperature is maintained at a constant value for about 1 hour and sulfuryl fluoride is then introduced into the mill from a storage tank. The sulfuryl fluoride concentration is maintained at a constant value of 35 g/cbm, the heater having been switched off already shortly before the introduction of the sulfuryl fluoride. The temperature in the mill drops to the initial temperature within 48 hours and the mill is then ventilated. All pests are dead, and no reinfestation can be seen even several weeks after the treatment. This is additionally confirmed by pheromone traps set up. Heat damage was not seen in the mill.

While specific embodiments of the invention have been shown and described in detail to illustrate the application of the principles of the invention, it will be understood that the invention may be embodied otherwise without departing from such principles.

What is claimed is:

1. A process for disinfestation of a pest-infested enclosed space, the process comprising the steps of:
   providing a combustion heater generating exhaust flue gas;
   circulating air between the pest-infested enclosed space and the heater to heat the air in the enclosed space and increase a temperature of the enclosed space to above approximately 22 degrees Celsius while maintaining the air from the enclosed space separate from the exhaust flue gas;
   introducing sulfuryl fluoride into the enclosed space at one of before, during or after said heating of the air of the enclosed space.

2. The process in accordance with claim 1, wherein:
   said heating of the air is performed to raise a temperature of the air in said enclosed space to a value below a decomposition temperature of said sulfuryl fluoride.

3. A process for the disinfestation of a pest-infested enclosed space, the process comprising the steps of:
   introducing hot air into the space to be treated by means of a fuel-heated heater;
   providing the heater with a separate flue gas routing, as a result of which no flue gases will enter the space being treated;
   providing the heater with a combustion chamber;
   providing a heat exchanger and a heat exchanger chamber;
   separating the heat exchanger from a combustion chamber in a gas-tight manner;
   circulating air from the enclosed space being treated through the heat exchanger chamber and back to the enclosed space continuously or intermittently, and heating the air during said circulating to increase a temperature of the enclosed space to within a range of approximately 22–40 degrees Celsius;
   introducing sulfuryl fluoride as a fumigant into the space being treated before, during or after the heating of the air of the space being treated.

4. The process in accordance with claim 3, further comprising adjusting relative humidity in the space being treated to a desired value by introducing water into the air circulating back into the space being treated, wherein the water is introduced by metering, directly using an atomizer, or by spraying.

5. The process in accordance with claim 3, further comprising:
   leading a feed line from the space being treated to the heat exchanger chamber;
   leading a return line from the heat exchanger chamber to the space being treated, wherein the combustion chamber in the heater is separated from the heat exchanger chamber in a gas-tight manner.

6. The process in accordance with claim 3, wherein the space to be treated is sealed in a gas-tight manner.

7. The process in accordance with claim 3, wherein the space to be treated is a room of a mill, a room of a food-processing plant or another pest-infested room.

8. A process for the disinfestation of mills, food-processing plants or other pest-infested rooms, the process comprising the steps of:
   introducing hot air into a room to be treated by means of a fuel-heated heater;
   providing the heater with a separate flue gas routing, as a result of which no flue gases will enter the room being treated;
   providing the heater with a combustion chamber;
   providing a heat exchanger and a heat exchanger chamber;
   separating the heat exchanger from the combustion chamber in a gas-tight manner;
   removing air to be heated from the room being treated through the heat exchanger chamber continuously or intermittently and heating the air;
   returning the air into the room being treated; and
   introducing sulfuryl fluoride as a fumigant into the room being treated before, during or after the heating of the air of the room being treated, said heating of the air is performed to raise a temperature of the air in the room being treated to within a range of approximately 22–40 degrees Celsius.

9. The process in accordance with claim 8, further comprising adjusting the relative humidity in the room being treated to a desired value by introducing water into said air returned to the room.

10. The process in accordance with claim 9, wherein the water is introduced by one of a metering, direct introduction, an atomizer or a spray.

11. The process in accordance with claim 8, further comprising:
  leading a feed line from the room being treated to the heat exchanger chamber;
  leading a return line from the heat exchanger chamber to the room being treated, wherein the combustion chamber in the heater is separated from the heat exchanger chamber in a gas-tight manner.

12. The process in accordance with claim 8, wherein the room to be treated is sealed in a gas-tight manner.

* * * * *